J. R. STAUDT.
ADJUSTABLE SPRING CLAMP.
APPLICATION FILED AUG. 5, 1919.
1,406,695.
Patented Feb. 14, 1922.
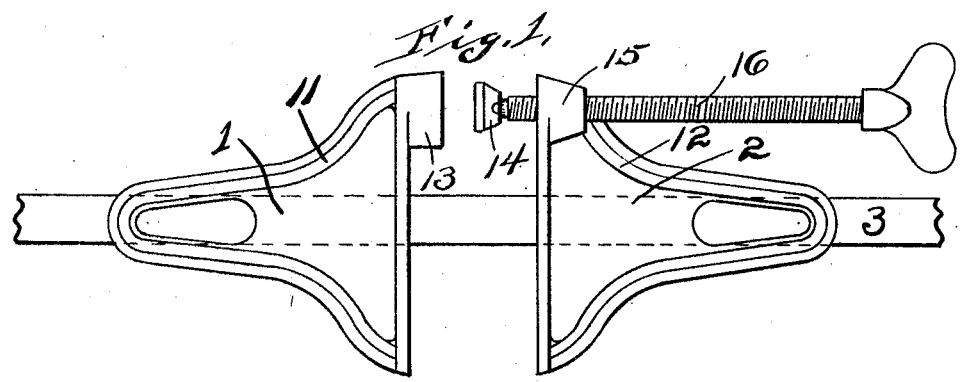
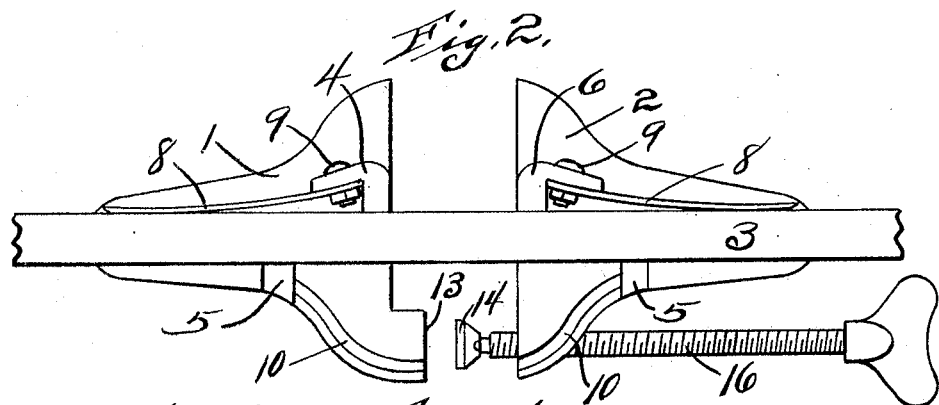
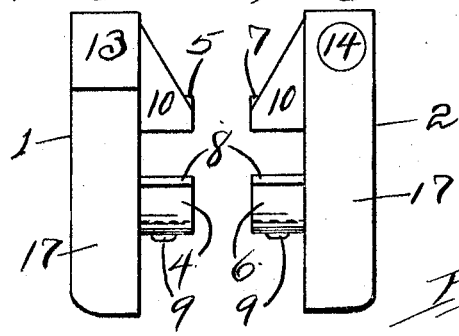
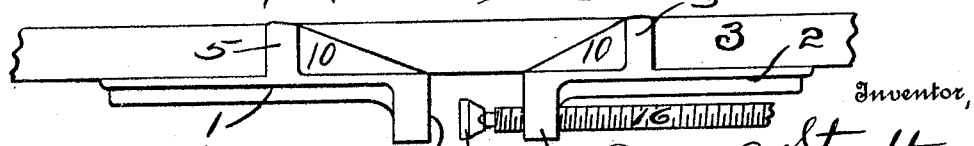
Inventor,
James R. Staudt,
By A. L. Jackson
Attorney
Witness
John E. Melton

UNITED STATES PATENT OFFICE.

JAMES R. STAUDT, OF FORT WORTH, TEXAS.

ADJUSTABLE SPRING CLAMP.

1,406,695.      Specification of Letters Patent.     Patented Feb. 14, 1922.

Application filed August 5, 1919. Serial No. 315,459.

*To all whom it may concern:*

Be it known that I, JAMES R. STAUDT, a citizen of the United States of America, residing at Fort Worth, in the county of Tarrant and State of Texas, have invented certain new and useful Improvements in Adjustable Spring Clamps, of which the following is a specification.

My invention relates to clamps and more particularly to adjustable spring clamps, and the object is to provide simple and efficient clamps which are adapted for various uses, as for holding narrow pieces of work or wide pieces of work, such as pieces of work which are being glued together. Another object is to provide clamps which may be used on a bar adapted for carrying the clamps or which may be attached to any convenient board, or table or work bench. Other objects and advantages will be fully explained in the following description and the invention will be more particularly pointed out in the claim.

Reference is had to the accompanying drawings which form a part of this application.

Fig. 1 is a plan view of the clamping members. Fig. 2 is an inverted plan view. Figs. 3 and 4 are face views of the two members. Fig. 5 is an edge view of the two members assembled as in Figs. 1 and 2.

Similar characters of reference are used to indicate the same parts throughout the several views.

The drawings show the clamping members 1 and 2 mounted on a bar 3 which may be of any ordinary length. The member 1 has laterally projecting lugs 4 and 5 and the member 2 has laterally projecting lugs 6 and 7. The clamps are mounted on the bar 3 by means of these lugs and by means of springs 8 which are bolted to the clamps 1 and 2 by bolts 9. The springs 8 bear against the bar 3 and hold the clamps firmly thereon. It will be understood that the lugs 4 and 5 and 6 and 7 and the springs 8 may engage the side or edge of a table or work bench or other device and operate in the same manner as when used on a bar 3. The lugs 4 and 5 and 6 and 7 are preferably formed integral with the clamping body members and ribs 10 are also formed integral with the body members of the clamps and integral with the lugs 5 for bracing and strengthening the lugs 5. The body members of the clamps have strengthening ribs 11 and 12.

The work may be held against the bearing face 13 and by the holding block 14 which has a swivel connection with a screw shaft 16 which operates in a screw-threaded bearing 15. The screw shaft 16 may be manually operated for adjusting the clamps on the work.

When the swivel block bears against the work and the screw shaft 16 is used to force the swivel block against the work, the clamping members will be made rigid with the clamp supporting bar 3. From the construction of the clamping members, it will be seen that the devices may be used in a great variety of ways. A piece of work may be horizontally or vertically disposed and be held rigid in either position and the clamping members may engage the edge of a table or work bench or other device. The clamping members may be readily sprung on the bar 3 or other support by reason of the spring 8.

What I claim, is,—

A pair of clamping jaws having opposing faces and thrust means carried by one face to press work against the other, each jaw having a pair of lugs projecting laterally or transversely of the clamping faces and spaced from each other both parallel to and at right angles to the clamping plane, so as to embrace or bind upon a common body engaged between both pairs of lugs.

In testimony whereof, I set my hand, this 1st day of August, A. D., 1919.

JAMES R. STAUDT.